United States Patent [19]
Huotari

[11] Patent Number: 6,138,038
[45] Date of Patent: *Oct. 24, 2000

[54] SYSTEM FOR ESTABLISHING AN OUTGOING CONNECTION FROM TERMINAL EQUIPMENT TO A DATA TRANSMISSION SYSTEM

[75] Inventor: Arto Huotari, Oulu, Finland

[73] Assignee: Nokia Mobile Phones Limited, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/822,118

[22] Filed: Mar. 21, 1997

[30] Foreign Application Priority Data

Mar. 22, 1996 [FI] Finland ................................ 961330

[51] Int. Cl.$^7$ ......................................... H04B 1/38
[52] U.S. Cl. ........................... 455/564; 455/3.1; 379/355
[58] Field of Search .................................. 455/564, 565, 455/575, 422, 426, 557, 3.1, 5.1, 554; 379/354, 355, 352

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,775,997 | 10/1988 | West, Jr. et al. | 379/58 |
| 4,922,517 | 5/1990 | West, Jr. et al. | 379/58 |
| 4,959,851 | 9/1990 | Tobolski, Jr. et al. | 455/557 |
| 5,117,450 | 5/1992 | Joglekar et al. | 455/564 |
| 5,267,308 | 11/1993 | Jokinen et al. | 455/564 |
| 5,402,481 | 3/1995 | Waldman | 379/355 |
| 5,467,383 | 11/1995 | Urasaka et al. | 455/564 |
| 5,475,743 | 12/1995 | Nixon et al. | 379/355 |
| 5,535,260 | 7/1996 | Zicker et al. | 455/564 |
| 5,581,595 | 12/1996 | Iwashita et al. | 455/564 |
| 5,722,087 | 2/1998 | Ala-Mursular et al. | 455/564 |
| 5,722,088 | 2/1998 | Storn et al. | 455/564 |

FOREIGN PATENT DOCUMENTS

2 252 696   8/1992   United Kingdom .
2 282 732   4/1995   United Kingdom .

OTHER PUBLICATIONS

WPI Abstract Accession No. 85–270525/44 & DE3412590 A (Standard Elek) Jan. 24, 1985 (see abstract).
WPI Abstract Accession No. 97–219543/20 & J09064957 A (Nippon Telegraph & Telephone) Mar. 7, 1997 (see abstract).
European Telecommunication Standards Institute (ETSI) prETS 300557, May 1995, GSM 04.08 version 4.11.0.
Mouly, Pautet, "The GSM System for Mobile Communications" 1992, pp. 530–543.

*Primary Examiner*—Nay Maung
*Assistant Examiner*—Quochien B. Vuong
*Attorney, Agent, or Firm*—Perman & Green, LLP

[57] ABSTRACT

The objects of the invention are a method for establishing outgoing connections, and a terminal equipment and a data transmission system using the method. The invention is advantageously appicable to wireless local loop (WLL) systems. According to the invention, upon selection of a connection code consisting of a sequence of digits, the dialled digits are monitored (103) and it is checked (105, 107) whether the sequence of digits consisting of the dialled digits is identical with any one of the connection coded dialled last. If the sequence of digits is identical with any one of the connection codes dialled last, and especially, if an outgoing connection has already previously been established using this sequence, it is known that the connection code contains no more digits, and thus the sequence of digits is transmitted (109) to the base station for establishment of the connection. In case the dialled sequence of digits is not idential with any one of the connection codes dialled last, the terminal equipment waits (103, 121) for the dialling of the next digit for a predetermined time, and if no next digit is dialled within this time, the terminal equipment transmits (109) the sequence of digits consisting of the dialled digits to the base station as the connection code for establishing an outgoing connection. A list of the connection codes dialled last is contained in the memory of the terminal equipment so that the dialled sequence of digits can be compared with these.

20 Claims, 2 Drawing Sheets

SYSTEM FOR ESTABLISHING AN OUTGOING CONNECTION FROM TERMINAL EQUIPMENT TO A DATA TRANSMISSION SYSTEM

BACKGROUND OF THE INVENTION

1. Field of the Invention

The present invention relates to data transmission and particularly to a method and means for establishing an outgoing connection from terminal equipment to a base station in a data transmission system. The invention is advantageously applicable to wireless local loop (WLL) systems.

2. Description of the Prior Art

In data transmission systems, the outgoing connection is usually established by a connection code, such as a telephone number. In a fixed line telephone network, each digit of the number is directly transmitted to the exchange as the dialling proceeds. The dialled numbers are analysed in the exchange, and a connection is established right after the dialled sequence has been detected to be an existing telephone number.

Typically, in cellular systems, dialling is done locally. The number is dialled on the keypad and, once the dialling has been completed, a special SEND key is pressed to transmit the dialled number information to the system for analysis.

Terminal equipment used in wireless local loop (WLL) networks include a telephone which can be linked to the public telephone network and a transceiver unit connected to it. Usually, the transceiver unit is linked to the cellular services by radio communication. However, as there is no SEND key available, one of the problems in the WLL systems has been how to decide, when the dialling has been accomplished.

A previously known solution is to use a special end character, which tells the dialling has been completed. A special key character is such a character (e.g.# or *) which is normally not used for dialling. Pressing of the special key tells the terminal that the dialling has been completed, and the number can be transmitted to the base station of the data transmission system. A disadvantage of this solution is, however, that the dialling procedure differs from the one used in conventional fixed networks, and thus the user has to master several different dialling procedures.

Another prior art solution has been to use time supervision. According to this, the elapsed time starting from the last dialled digit is counted, and after a predetermined time, the dialling is supposed to have been completed and the dialled sequence of digits is transmitted to the base station as the connection code.

However, the problem with time supervision is the considerable additional delay needed for the establishment of the connection. This delay is summarized with the time that the system needs to establish the connection. Together, these time delays can become too long compared with the ones needed in a conventional fixed network, where the time elapsed after the dialling of the sequence of digits can be very short. This problem can be diminished by shortening the predetermined delay time. This, however, leads to other problems. Namely, the dialling procedure is not always a constantly ongoing process; e.g. a telephone catalogue may be consulted at the same time for numbers not yet dialled, which may cause a pause of several seconds. If this pause is interpreted as the completion of the dialling procedure, the terminal equipment sends an incomplete telephone number to the base station, and the establishment of the connection fails.

Prior art solutions for realization of WLL systems have more closely been described e.g. in the following patent publications: [1] U.S. Pat. No. 4,658,096; [2] U.S. Pat. No. 4,737,975; [3] U.S. Pat. No. 4,775,997, and [4] U.S. Pat. No. 4,922,517.

OBJECTS OF THE INVENTION

The objective of the invention is to create a solution for establishing an outgoing connection which can be used to solve the said problems. Further, it is an object of the present invention to provide a terminal equipment and a data transmission system applying the said method.

SUMMARY OF THE INVENTION

A concept of the present invention is, while dialling the connection code, to monitor the dialled digits of the sequence and to control, whether the sequence of digits formed by the dialled digits falls within the connection codes dialled last, and advantageously, whether an outgoing connection has previously been established by it. If the sequence of digits is the same as one of the connection codes used last, it is known that the code does not contain any more digits, and thus the dialled sequence of digits is sent to the base station of the data transmission system for connection establishment. If, instead, the dialled sequence is none of the ones dialled last, the terminal equipment waits for the dialling of the next digit for a predetermined time, and if the next digit is not dialled within this time, the terminal equipment sends the sequence of digits formed by the dialled digits to the base station for connection establishment. The connection codes dialled last are stored in the memory of the terminal equipment so that the dialled sequence of digits can be compared with these.

In this case, a connection code is a code including the data about the destination of the outgoing connection in the data transmission system. Advantageously, the connection code is a sequence of characters consisting of numbers, letters and/or symbols, such as a telephone number.

It is characteristic for the method of the present invention that at least one connection code is stored in the terminal equipment, the dialled sequence of digits is compared with at least the one connection code stored in the terminal eqipment, and that the dialled sequence of digits is sent to the base station as a connection code, in accordance with the result of the comparison made.

It is characteristic for the terminal equipment according to the present invention that it comprises means for storing at least one connection code, means for comparing the sequence of digits with at least the one stored connection code, and means for sending the dialled sequence of digits as a connection code to the data transmission system in accordance with the result of the comparison made.

It is characteristic for the data transmission system of the present invention that at least one connection code is stored in the terminal equipment related with the data transmission system, the dialled sequence of digits is compared with at least the one connection code stored in the terminal equipment, and that the dialled sequence of digits is sent as a connection code from the terminal equipment to the base station in accordance with the result of the comparison made.

BRIEF DESCRIPTION OF THE DRAWINGS

In the following, the present invention is described more closely in relation with the enclosed drawings, in which.

DETAILED DESCRIPTION OF THE PREFERRED EMBODIMENT(S)

Figure 1:
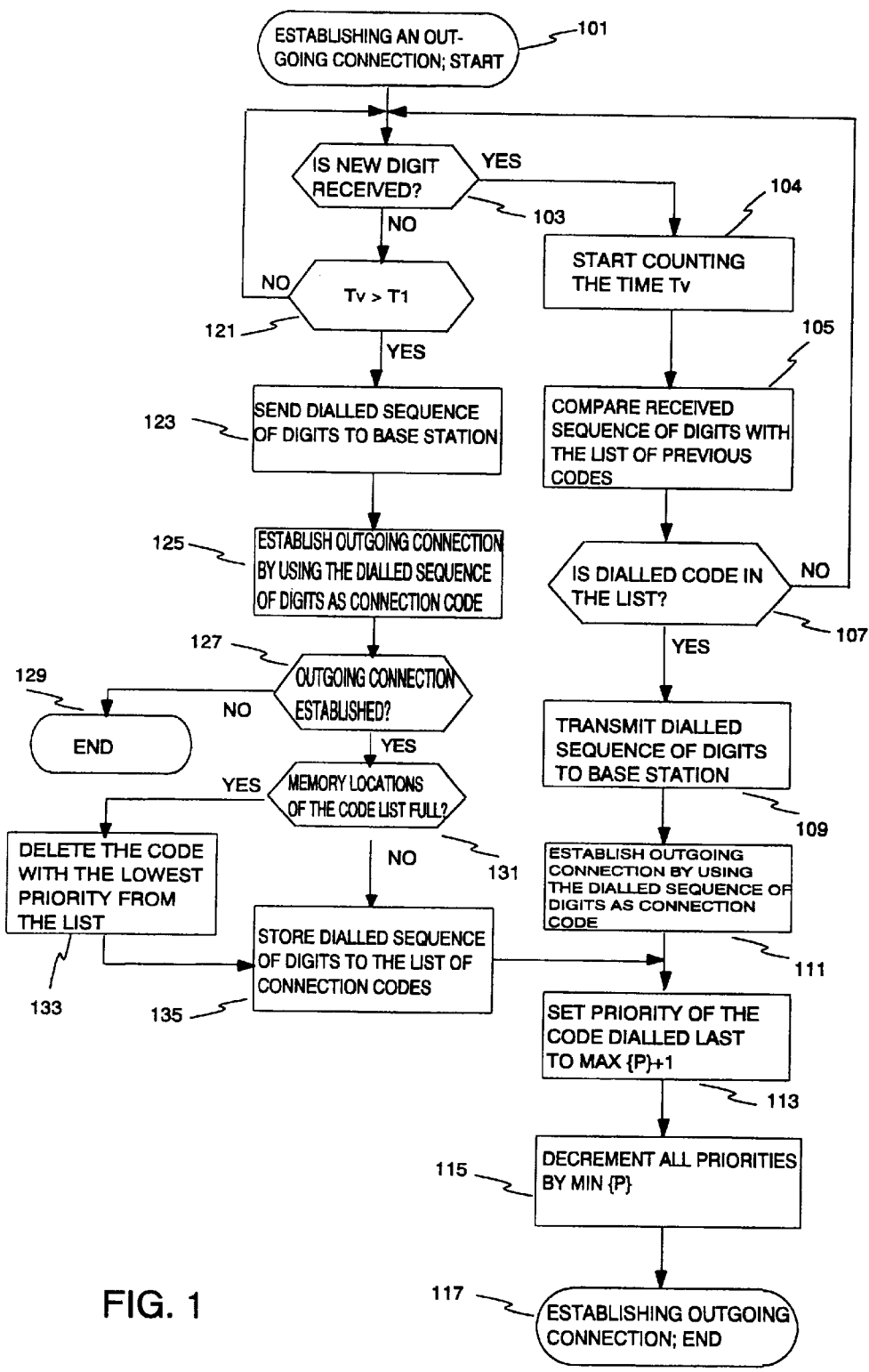
FIG. 1 is a flow diagram of a method of the present invention for establishing an outgoing connection.

In FIG. 1, there is shown a method according to the invention for establishing an outgoing connection. Upon establishment of an outgoing connection, 101, the digits of the sequence of digits being dialled are monitored in block 103, and after the selection of a new digit, the time Tv elapsing from the dialling of the last digit is counted in block 104. Thereafter, the dialled sequence of digits is compared with the stored connection codes, blocks 105 and 107. If the dialled sequence is not found among the stored codes, block 103 is consulted again. If the dialled sequence of digits is included in the list of the stored codes, the dialled sequence of digits is sent as a connection code to the base station, block 109, and the system establishes an outgoing connection on the basis of the connection code transmitted to the base station.

Priority data, according to which the connection codes are deleted from the list when all memory locations are full, is connected to the connection codes to be stored. The priority data related with the connection codes advantageously discloses, in which order the connection codes have been used previously. Also other factors can affect the priority; e.g. number of the times the connection code has been used. The priority data is next considered as a numerical value, although, in practice, it can also adopt another form, such as location of the connection code in the memory.

A priority value, which is the highest of the priorities related with the stored connection codes, is advantageously connected to the code dialled last. The priority Pv of the selected code is thus set, for example, to a value, which is the maximum priority Pmax of the connection codes stored previously, added with one, i.e. Pv=MAX{P}+1, block 113. In order to prevent the absolute values of the priorities from growing higher than is necessary, all the priority values are thereafter decremented by the value MIN{P}, which is the lowest of all the priority values, block 115. Thus the connection code with the lowest priority is set to the priority value zero.

If in the block 103 it is detected that a new digit has not been dialled, it is checked, whether the time elapsed from the dialling of the last digit, Tv, is longer than the predetermined first delay T1, block 121. If Tv is not longer than T1, block 103 is consulted again. If the time elapsed from the dialling of the last digit, Tv, is longer than the predetermined delay T1, the selected sequence of digits is used as the connection code for the outgoing connection. Then the selected sequence of digits is transmitted as the connection code to the base station, block 123, and the system tries to establish the outgoing connection on the basis of the connection code transmitted to the base station, block 125.

Thereafter it is monitored, whether the connection establishment is successful, block 127. If the establishment of the connection fails, measures for setting up a connection on the basis of the dialled sequence of digits are ended, block 129. The dialled sequence of digits is then not stored in the connection code list. The reason for the failure of the connection establishment may namely be, for example, that last digits are missing from the dialled sequence; storing the sequence of digits in the list might also later cause the incomplete sequence of digits to be transmitted to the base station, although the sequence of digits were dialled in complete form.

The establishment of an outgoing connection can be checked e.g. on the basis of a message the system transmits to the terminal equipment. For example, in the GSM system, the network sends a special "CONNECT" message for the terminal equipment, meaning that the other party has answered. The CONNECT message includes e.g. data about the connection code to which the connection has been established. Thereafter, the terminal equipment answers the network with "CONNECT ACKNOWLEDGEMENT" message and begins the data transmission connection of the user. The signalling for establishing an outgoing connection in accordance with the GSM system has been described more closely in the publication European Telecommunication Standards Institute (ETSI) prETS 300557, 05/1995, GSM 04.08 version 4.11.0.

In analog systems, such as in the NMT system, a message indicating the succeeding of the connection establishment and the validity of the used connection code can be indicated in the terminal equipment, for example, by monitoring the "ringing" or the "busy" tone received from the network. Besides the succeeding of the connection set-up, also other network information can be used to indicate whether the sequence of digits transmitted to the base station is an existing, complete connection code.

In case there were an incomplete connection code among the stored codes, it may be advantageous to wait another time delay T2 in block 109 before the dialled sequence of digits is sent to the base station; during the time delay the user may dial the next digit, returning thus to block 104. Thus it is possible to avoid the transmission of a stored, incomplete connection code to the base station. The said time delay T2 is, however, shorter than the time delay T1.

If, in the method described in FIG. 1, the connection is successfully established in block 125, the system checks if all the memory locations are full, block 131. In case all memory locations are full, the connection code with the lowest priority is deleted from the list, block 133. Next the dialled sequence of digits is stored in the list of dialled connection codes, block 135. Finally, the priorities of the stored connection codes are set, as described above, blocks 113 and 115, whereafter the establishment steps for an outgoing connection are completed, 117.

The memory, in which the list of the dialled connection codes are stored, can be organized e.g. according to the following table:

| Connection code 1 | Priority | value P(1)=0 |
|---|---|---|
| Connection code 2 | Priority | value P(2)=1 |
| Connection code 3 | Priority | value P(3)=2 |
| . | . | |
| . | . | |
| Connection code N | Priority | value P(N)=N−1 |

If the connection code N+1 dialled next is not found in the list of the connection codes stored previously, it is stored in place of a connection code with the lowest priority in the list, i.e. in the above-mentioned example in place of the connection code 1. The new stored connection code is given a priority value which is higher than any priority value of a previously stored connection code, for example N. After this, the connection code 2 has the lowest priority value, the value being 1. In order to prevent the absolute values of the priorities from increasing upon storing new priority values in the table, the lowest priority value of all the priorities in the list is decremented, i.e. value one in the example. Thereafter, the table is as follows:

| Connection code N+1 | Priority | value P(N+1)=N−1 |
|---|---|---|
| Connection code 2 | Priority | value P(2)=0 |
| Connection code 3 | Priority | value P(3)=1 |

| | | |
|---|---|---|
| . | . | |
| . | . | |
| . | . | |
| Connection code N | Priority | value P(N)=N−2 |

The priority values presented above have been shown as an example for illustrating the processing of the stored connection codes. In practice, it is not necessary to store the priority values separately for each connection code, but the priority information related with the connection codes may advantageously be indicated on the basis of the memory location. Then it is possible to store the connection codes to the memory locations e.g. in a predetermined order; in this case, one has to retain the information about which memory location contains the connection code stored last. The priorities of the other memory locations are determined by the said storing order.

One of the connection codes stored in the memory can be the emergency call number. It can be stored in a special memory location the contents of which can be altered only by a special command. Because the emergency call number is thus not replaced by the new selected connection code, no priority value is needed for it. Besides the emergency call number, also other special connection codes can be stored in the list, that are not deleted from the memory on the basis of priority information.

Figure 2:
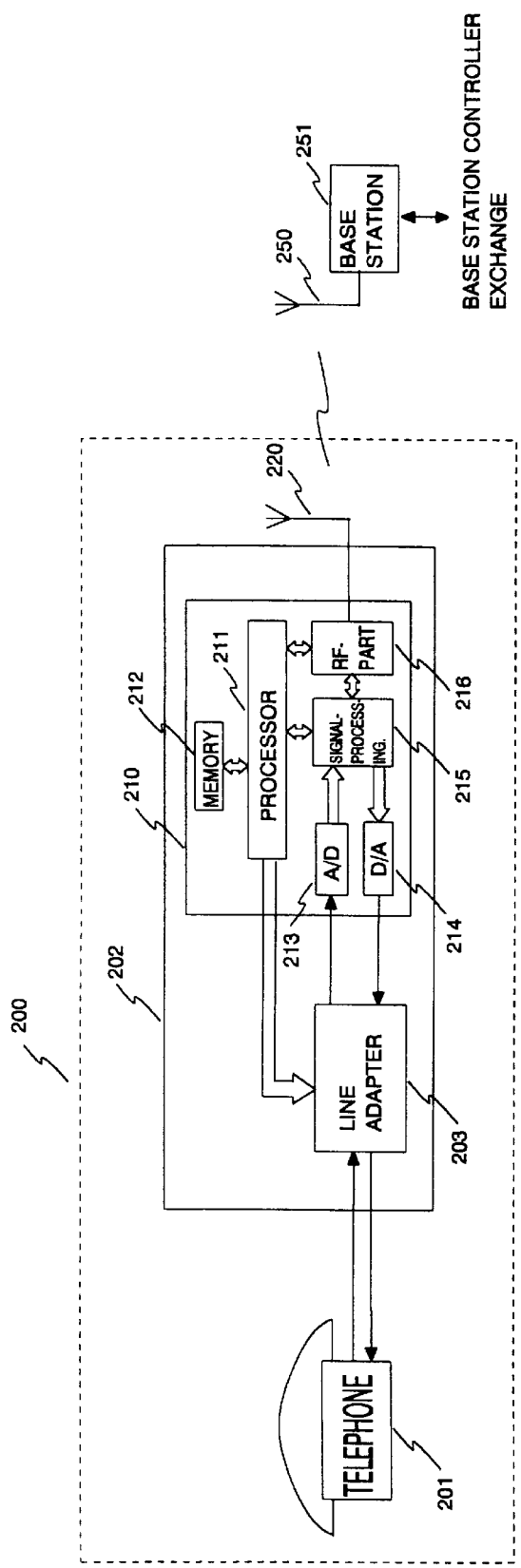
FIG. 2 is a block diagram of terminal equipment according to the invention, and of the way it is connected to the data transmission system.

FIG. 2 is a block diagram of a WLL terminal device 200 according to the present invention and of its connection to the data transmission system. It comprises an ordinary telephone adaptable to a subscriber connection of a conventional public telephone network that is connected with a radio component 210 via a line adapter 203. The radio component 210 may advantageously be a mobile station. The terminal equipment is connected to the base station 251 of the data transmission system by radio communication. For this purpose, the radio component and the base station have the antennas 220 and 250. The base station is still connected e.g. to the base station controller and the exchange of the data transmission system.

In case of a digital radio interface, an analog signal received from the telephone is converted to a digital signal using an A/D converter 213, the digital signal is given a signal processed 215 as determined by the data transmission system, and a transmission signal on a radio frequency is modulated with the produced signal in RF component 216, the modulated transmission signal being fed forward to the antenna 220.

Similarly, the signal received on a radio frequency is received from the antenna 220 to the RF component 216, where the signal is demodulated. The digital signal received from the RF component is given a signal processing, 215, and this digital audio signal is converted to an analog signal using a D/A converter 214.

In case the radio interface is based on analog FM modulation, the components 213–216 are replaced correspondingly by FM modulator in signal transmission and FM demodulator in signal reception.

A telephone for a conventional telephone network uses high voltages even of 60V between the telephone and the exchange. Also the call function of such a telephone is based on the voltage control in the operation loop. In order to establish such a connection, a line adapter is needed for connecting the conventional telephone and its accessories to a wireless subscriber connection. The line adapter produces a line voltage and indicates when the handset is on/off hook. In addition, the formation of dialling signals (and other control signals) is also carried out in the line adapter.

Further, the line adapter can perform the indication of DTMF signals. The line adapter is realizable by using known circuits, such as SLIC (Subscriber Line Interface Circuit). One such SLIC suitable for this purpose is the type Am79R79 manufactured by the company Advanced Micro Devices (USA). The interface between the telephone and the line adapter comprises typically 2–4 conductors.

The maximum amplitude levels between the line adapter and the A/D (or D/A) converter is typically 3V or 5V. The same maximum voltage level is typically used also between the line adapter and the FM modulator as well as the line adapter and the FM demodulator.

The operation of the line adapter is typically controlled by a microprocessor. The microprocessor may advantageously be a processor 211 of a mobile station 210, or it may be a separate processor. The mobile station processor 211 may advantageously be used also for counting the time elapsed from the dialling of the last digit and for comparing the dialled sequence of digits with stored, previously dialled connection codes. Also a memory 212 connected to the processor 211 may be used for storing the previously dialled connection codes.

The mobile station 202 may also include other blocks, such as operation interface equipment, which are not shown in the drawings.

Some embodiments according to the present invention have been described above. The principle of the invention can naturally be varied within the scope of the claims e.g. in respect of the details of the realization and the application areas.

What is claimed is:

1. A method for establishing an outgoing connection from terminal equipment to a data transmission system having a base station, wherein a sequence of digits is dialled using the terminal equipment, a connection code in accordance with the dialled sequence of digits is transmitted from the terminal equipment to the base station of the data transmission system, and the data transmission outgoing connection is established on the basis of the transmitted connection code, said method comprising the steps of:

storing at least one sequence of digits representing a connection code indicative of a previously dialled sequence of digits in memory in the terminal equipment, comparing a dialled sequence of digits during dialling with at least the one sequence of digits stored in the memory of the terminal equipment, and after the comparing step, transmitting the dialled sequence of digits as a connection code to the base station in accordance with the result of said comparing step to establish an outgoing connection.

2. A method according to claim 1, wherein a number of sequences of digits, each representing a connection code, are stored in memory in the terminal equipment and when the dialled sequence of digits differs from all of the sequences of digits representing the connection codes stored in memory in the terminal equipment, the system waits for the dialling of the next digit, and unless a new digit is dialled within a first time delay (T1), the dialled sequence of digits is transmitted to the base station as the connection code.

3. A method according to claim 1, wherein a sequence of digits corresponding to the dialled sequence of digits transmitted to the base station is stored in memory in the terminal equipment as a connection code.

4. A method according to claim 3, wherein said sequence of digits corresponding to the sequence of digits to be transmitted to the base station is stored in memory in the terminal equipment as a connection code upon the establishment of the outgoing connection.

5. A method according to claim 2, wherein when the dialled sequence of digits is identical to one of the sequences of digits representing the connection codes stored in the memory, said one of the sequences of digits representing the connection codes is transmitted to the base station before said first time delay (T1) is up.

6. A method according to claim 1, wherein a number of sequences of digits, each representing a connection code, are stored in a list in memory in the terminal equipment and priority information related with the list of stored connection codes is stored in memory.

7. A method according to claim 6, wherein said priority information indicates the chronological storing order of the connection codes in the list.

8. A method according to claim 6, wherein a sequence of digits corresponding to a dialled sequence of digits transmitted to the base station is stored in memory in the terminal equipment as a connection code, and upon storing the connection code dialled last, a previously stored connection code is deleted from said list, and said connection code to be deleted is selected on the basis of the priority information related with said connection code.

9. A method according to claim 8, wherein at least one special connection code is stored in said list, which is not deleted from the list upon storing the connection code dialled last.

10. A terminal equipment comprising:
    means for dialling a sequence of digits, and
    means for transmitting the dialled sequence of digits as a connection code to a data transmission system in order to establish an outgoing connection on the basis of said connection code, wherein the improvement comprises:
        means for storing at least one connection code indicative of a previously dialled sequence of digits,
        means for comparing a dialled sequence of digits with at least the one stored connection code during dialling, and producing a result of a comparison, and
        means, responsive to a result of a comparison produced by said comparing means, for establishing an outgoing connection and transmitting the dialled sequence of digits as a selected connection code to the data transmission system in accordance with the result of a comparison by said comparing means.

11. A terminal equipment according to claim 10, further comprising means for connecting priority information to the connection code stored in said storing means.

12. A terminal equipment according to claim 11, wherein said storing means further comprises:
    means for storing a number of sequences of digits, each representing a connection code, in a list with priority information related with the stored connection codes, and
    means for deleting a connection code from said list in accordance with the priority information related with the stored connection codes.

13. A data transmission system including at least one terminal equipment having a stored connection code and comprising at least one base station with a connection going out from the terminal equipment to the base station being established on the basis of a connection code, when the connection code is selected by being dialled in the terminal equipment, and the selected connection code is transmitted from the terminal equipment to the base station, wherein the improvement comprises:
    means for storing at least one connection code in the form of a sequence of digits indicative of a previously dialled sequence of digits, in the terminal equipment of the data transmission system,
    means for comparing a dialled sequence of digits during dialling with at least the one connection code stored in the terminal equipment to determine if the dialled sequence of digits is a selected connection code and producing a result of the comparison, and
    means, responsive to a result of a comparison produced by said comparing means, for transmitting the selected dialled sequence of digits as a connection code from the terminal equipment to the base station in accordance with the result of the comparison by said comparing means.

14. A terminal equipment according to claim 10, wherein said storing means comprises means for storing a number of sequences of digits, each representing a connection code, and means for waiting for the dialling of the next digit when the dialled sequence of digits differs from all of those representing the stored connection codes, and, unless a new digit is dialled within a first time delay (T1), for transmitting the dialled sequence of digits to the base station as the connection code.

15. A terminal equipment according to claim 10, wherein said storing means comprises means for storing a number of sequences of digits, each representing a connection code, in a list with priority information related with the chronological storing order of the connection codes in the list, and further comprising means for deleting, upon the storing of the connection code dialled last, a previously stored connection code selected on the basis of the priority information related with said connection code.

16. A terminal equipment according to claim 15, further comprising means for storing at least one special connection code in said list, which is not deleted from the list upon the storing of the connection code dialled last.

17. A terminal equipment according to claim 12, further comprising means for actuating said means for deleting a connection code from said list each time an outgoing connection is made.

18. A data transmission system according to claim 13, wherein said storing means comprises means for storing a number of sequences of digits, each representing a connection code, and means for waiting for the dialling of the next digit when the dialled sequence of digits differs from all of those representing the stored connection codes, and, unless a new digit is dialled within a first time delay (T1), for transmitting the dialled sequence of digits to the base station as the connection code.

19. A data transmission system according to claim 13, wherein said storing means comprises means for storing a number of sequences of digits, each representing a connection code, in a list with priority information related with the chronological storing order of the connection codes in the list, and further comprising means for deleting, upon the storing of the connection code dialled last, a previously stored connection code selected on the basis of the priority information related with said connection code.

20. A data trasnmission system according to claim 19, further comprising means for storing at least one special connection code in said list, which is not deleted from the list upon the storing of the connection code dialled last.

* * * * *